Dec. 25, 1956 J. L. BORDEWIJK ET AL 2,775,655

AMPLIFIER CIRCUIT

Filed July 22, 1952

INVENTORS
JAN TE WINKEL
JAN LOURENS BORDEWIJK
JOSEPH FREDERIK LANSU
BY Fred M Vogel
AGENT

United States Patent Office 2,775,655

Patented Dec. 25, 1956

2,775,655

AMPLIFIER CIRCUIT

Jan Lourens Bordewijk, Delft, Joseph Frederik Lansu, Hilversum, and Jan te Winkel, Eindhoven, Netherlands, assignors to Hartford National Bank and Trust Company, Hartford, Conn., as trustee Application July 22, 1952, Serial No. 300,172

Claims priority, application Netherlands August 21, 1951

4 Claims. (Cl. 179—171)

The invention relates to amplifier circuits for wide frequency bands comprising at least a first amplifier stage followed by a second amplifier stage and negative current feedback by means of an impedance (negative feedback impedance) which is included in the cathode circuit of the second amplifier stage and from which is derived a negative feedback voltage which is fed to at least one amplifier stage preceding the second stage.

It is known that the reduction of distortion in such a circuit cannot be continued to an unlimited extent by increasing the negative feedback coupling, but it is found to be determined primarily by the value of the quotient of the mutual conductance divided by the stray grid-cathode-capacity of the electron discharge device of the second amplifier stage due to the fact that the current passing through the negative feedback impedance is not exactly equal to the current passing in the output circuit of said second stage and especially contains as a component the current passing through the grid cathode impedance, particularly the stray grid-cathode capacity of the discharge device of the second amplifier stage.

A prior proposal suggests that the said current component should be compensated by means of a Wheatstone bridge circuit-arrangement formed by two impedances, which jointly constitute the negative feedback impedance, the grid cathode impedance of the device of the said second stage and the anode impedance of the said first stage.

The object of the present invention is to provide a circuit in which the said compensation is achieved in a different manner, permitting, for example, the cathode of the device of the said first amplifier stage to be connected to a point of constant potential.

According to the invention, the anode of the discharge device of the first stage is connected to earth potential by way of the series combination of a first inductance and an impedance, a second inductance included in the cathode circuit of the second stage being tightly coupled to the said first inductance and the impedance being proportioned so that the current component which is obtained from the device of the first stage and which, due to the grid-cathode-impedance of the device of the second stage, passes through the negative feedback impedance is substantially compensated as far as the frequency range to be amplified is concerned.

In order that the invention may readily be carried into effect, an example will now be described in detail with reference to the accompanying drawings, in which.

Figure 1:
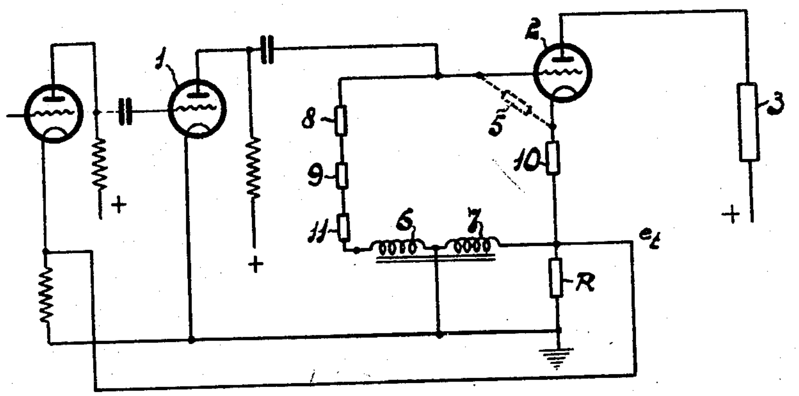
Fig. 1 is a schematic circuit diagram of one embodiment of the invention.

Referring to Fig. 1, the oscillations to be amplified are fed to an electron discharge device 1 of a first amplifier stage followed by an electron discharge device 2 of a second amplifier stage, so that amplified oscillations are set up across an output impedance 3. The cathode circuit of the second stage includes a negative feedback impedance R having, at least within the frequency range to be amplified, primarily a resistive impedance, the impedance R having set up across it a voltage $e_t$ which is substantially proportional to the current passing through the output impedance 3 and which is supplied to the device of a stage preceding the second stage, for example, the device 1 (this negative feedback is not shown) or a device connected so as to precede it (this negative feedback is shown). If desired, the cathode circuit of the second stage also includes an impedance 10 which sets up an individual negative feedback of the device 2.

It is known that the current passing through the impedance 5 which represents the stray grid-cathode-capacity of the device 2 of the second stage and is located between the grid and cathode of the device 2, causes the current passing through the negative feedback impedance R not to be exactly equal to the current passing through the output impedance 3, with the result that the distortion-reduction cannot be increased by means of feedback coupling to a further extent than corresponds to the ratio between the mutual conductance and the stray grid-cathode-capacity of the device 2 of the second stage.

Figure 2:
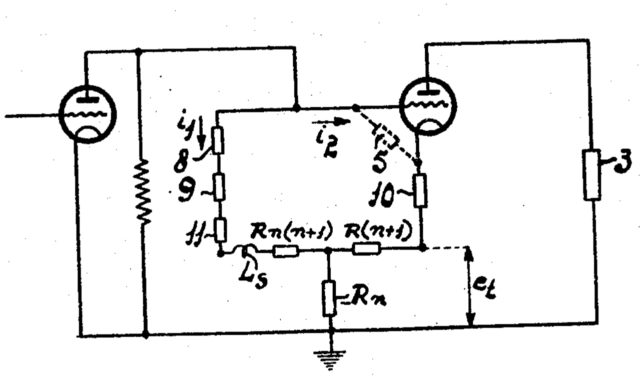
Fig. 2 shows the equivalent circuit of Fig. 1.

In order to compensate the current component which passes through the negative feedback impedance R and is obtained from the current of the device 1 through the said grid-cathode-impedance 5, the anode of the device 1 of the first amplifier stage is connected to earth potential by way of the series combination of a first inductance 6 and impedances 8, 9, 11 which, if required, may be united to form one or two impedance elements the said first inductance 6 having rigidly coupled to it a second inductance 7 included in the cathode circuit of the second stage and the impedances 8, 9, 11 being proportioned so that the ratio between the current $i_2$ (compare Fig. 2), which passes from the anode of device 1 through the grid-cathode-impedance 5 of the device 2, an impedance 10 that may have been provided and the inductance 7 to earth, and the current $i_1$, which passes from the anode of the device 1 through the impedances 8, 9, 11 and the inductance 6 to earth, is equal to the ratio $n$ between the number of turns of the inductance 6 and that of the inductance 7. The current passing through the negative feedback impedance R will thus be prevented from containing a component obtained from the current which passes the device 1, and thus enable the distortion-reduction to be considerably increased.

The impedance 5 is normally of primarily capacitative nature and the impedance 8 is therefore chosen to be of correspondingly capacitative pattern having an $n$-fold impedance value. If use is made of an individual negative feed-back resistor 10 in the cathode circuit of the second stage, an $n$-fold resistor 9 is required to be used, it being desirable for the ratio $n$ considerably to exceed 1, for example to be from 2 to 4, so as to enable the value of the capacitative part of the impedance 8 to be maintained low, so that the phase shift for frequencies beyond the frequency range to be amplified is not increased unnecessarily and the stability is thus not adversely affected. If the aforesaid ratio $n$ is maintained between the value of the impedance combination 8, 9, 11 and that of the impedance combination 5, 10, then the previously mentioned ratio $n$ will occur between the values of the currents $i_2$ and $i_1$.

In the foregoing it is understood that the inductances 6 and 7 are coupled together tightly enough for the stray inductance of the transformer formed by the inductances 6 and 7 to be negligible. In practice, the existence of the stray inductance is responsible for the fact that an inductance $L_s$ (Fig. 2) is set up in series with the impedances 8, 9 and forms with the impedance 8, which behaves as a capacity, a series resonance, which resonance, by adjusting it to a suitable value beyond the frequency range to be amplified and damping it by means of a resistor 11 (which, if required, may be associated with the resistor 9), improves the stability of the circuit, without greatly subtracting from the distortion reduction, even for high frequencies to be amplified, the resistor 11 being required to be of the same order of magnitude as the impedance of the capacitance 8 at the said series resonance.

What we claim is:

1. A wide band amplifier arrangement comprising first and second amplifier stages in coupled relationship, each of said stages having an electron discharge device having a cathode, a control grid and an anode, a signal-conductive connection between the anode of said first stage and the control grid of said second stage, the cathode circuit of said second stage including a negative feedback impedance, means for applying a negative feedback voltage developed across said negative feedback impedance to said first amplifier stage, a first impedance, a first inductance connected serially with said first impedance between the anode of the device of said first stage and ground, and a second inductance included in said cathode circuit, said second inductance being tightly coupled to said first inductance and so related to the cathode circuit as to introduce therein at a point between the last-mentioned cathode and the feedback impedance an induced compensating current component in opposition to any current in the frequency region to be amplified which flows from the electron discharge of the first stage through the capacitive grid-cathode path of the second stage device, the relative values of said tightly coupled inductances and of said first impedance being such that any flow through said feedback impedance of the said current through the grid-cathode path is substantially eliminated.

2. A circuit as set forth in claim 1, including an electrical connection between said negative feedback impedance and said second inductance and wherein the ratio $n$ between the number of turns of said first inductance and that of the second inductance is substantially greater than 1 and the value of said first impedance is $n$ times the impedance measured through said grid-cathode path between the anode of the device of said first stage and said electrical connection.

3. A circuit as set forth in claim 1 wherein said negative feedback impedance is substantially a resistor at least for the frequency range in which the oscillations are to be amplified and wherein said negative feedback impedance is connected in parallel with said second inductance.

4. A circuit as set forth in claim 3 wherein said first impedance includes a resistive portion and a capacitative portion and said first inductance includes stray inductance and wherein the resistive portion of said first impedance is increased by an amount which is of the order of magnitude of the impedance of the capacitative portion of said first impedance measured at the resonance frequency of the circuit formed by said capacitative portion and said stray inductance.

References Cited in the file of this patent

UNITED STATES PATENTS

| | | |
|---|---|---|
| 1,681,102 | Dalet | Aug. 14, 1928 |
| 2,379,168 | McClellan | June 26, 1945 |
| 2,452,563 | Glover | Nov. 2, 1948 |
| 2,476,875 | Ketchledge | July 19, 1949 |